United States Patent [19]

Corgnier et al.

[11] Patent Number: 4,602,283
[45] Date of Patent: Jul. 22, 1986

[54] SYSTEM FOR SPATIALLY AND TEMPORALLY TRANSPOSING DATA WORDS ARRAYED IN PERIODICALLY RECURRING PATTERNS

[75] Inventors: Luigi Corgnier; Benedetto Riolfo, both of Turin; Mario Guglielmo, Montalenghe, all of Italy

[73] Assignee: CSELT - Centro Studi e Laboratori Telecomunicazioni S.p.A., Turin, Italy

[21] Appl. No.: 545,142

[22] Filed: Oct. 25, 1983

[30] Foreign Application Priority Data

Oct. 25, 1982 [IT]  Italy ................................ 68237 A/82

[51] Int. Cl.[4] ........................ H04N 7/167; H04L 9/00; H04Q 11/04
[52] U.S. Cl. .................................... 358/119; 375/2.1; 179/1.5 S; 178/22.04; 178/22.09; 370/68
[58] Field of Search .......................... 358/119; 375/2.1; 179/1.5 S; 178/22.04, 22.09; 455/30; 370/68, 99

[56] References Cited

U.S. PATENT DOCUMENTS

| 3,773,977 | 11/1973 | Guanella | 178/22.05 |
| 4,405,942 | 9/1983 | Block et al. | 358/123 |
| 4,434,323 | 2/1984 | Levine et al. | 178/22.17 |

OTHER PUBLICATIONS

Saito et al, "PCM Toll Switching Networks Using Partial-Access Pulse Shifters, *Electronics and Communications in Japan*, 1976, pp. 53–62.

*Primary Examiner*—S. C. Buczinski
*Assistant Examiner*—Linda J. Wallace
*Attorney, Agent, or Firm*—Karl F. Ross; Herbert Dubno

[57] ABSTRACT

A train of incoming data words, specifically digitized video samples arrayed in frames of Y lines of X pixels each which have already undergone a 2-dimensional spatial transformation, is scrambled by being divided into Z sequences (frames) whose data words are temporarily written in respective cells of $Z^2$ storage units of a memory of dynamic-RAM Type. The $Z^2$ storage units, each divided into Z sections, are read out in cyclic-succession—at a rate of one cell per unit—and each cell is reloaded immediately after being vacated. Reading and writing occurs for one set of Z sequences in a first addressing mode, conforming to the order of arrival of the data words in the incoming train, and for the next set in a second addressing mode involving the grouping of homologous data words of respective sequences into successive series of Z data words each. The two addressing modes alternate for consecutive sets and the outgoing train so formed can be subjected to a further transformation before being transmitted to a remote station for unscrambling.

11 Claims, 9 Drawing Figures

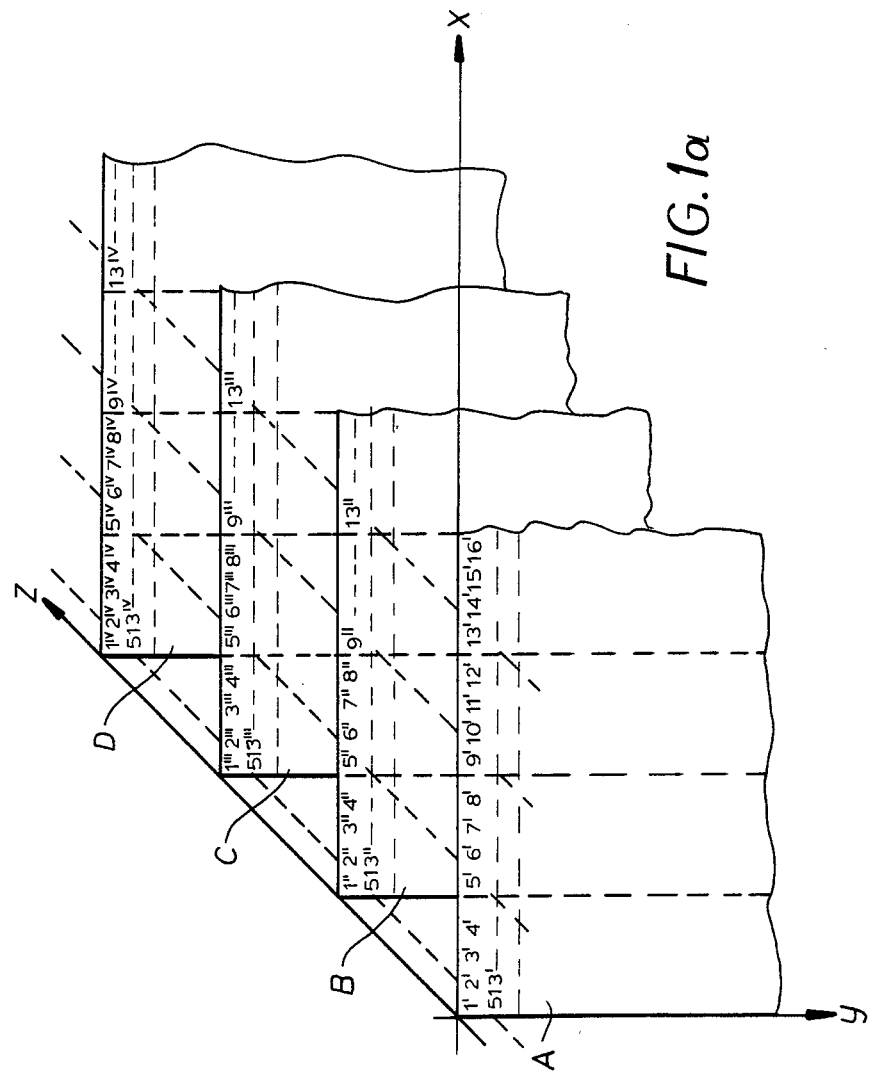

FIG.7

SYSTEM FOR SPATIALLY AND TEMPORALLY TRANSPOSING DATA WORDS ARRAYED IN PERIODICALLY RECURRING PATTERNS

FIELD OF THE INVENTION

Our present invention relates to a method of spatially and temporally transposing data words arrayed in periodically recurring patterns, e.g. digitized signal samples representing image points of a picture to be televised, and to a system for implementing this method.

BACKGROUND OF THE INVENTION

As is well known in the art, a television picture comprises a video frame recurring at a rate of about 30 times per second (for black-and-white images) and containing roughly 500 lines of as many picture elements (pixels) each. For reasons of personal privacy, commercial interest or national security it is often desirable to transform such a train of digitized video signals—or, for that matter, any other train of data words—into a form which does not enable ready reconstruction of the original information content by an interceptor. This technique, known as "scrambling", requires a certain transposition of the data words within the train in a manner known to an authorized receiver who uses the converse of that procedure to "unscramble" the arriving modified train so as to restore the data words to their original order of succession.

Such a transformation and retransformation requires the use of a memory capable of accommodating all the data words involved in the scramble. In video transmission, in particular, it would be convenient to carry out the transposition among a recurrent set of Z frames which may be considered a 3-dimensional structure $X \cdot Y \cdot Z$, with X denoting the number of pixels per line and Y being the number of lines per frame while Z is a temporal dimension. Since the contents of the memory cells are not being read in the same order in which they are written, the use of an unvarying transposition pattern does not allow for a reloading of a cell immediately after its contents have been read out.

A simple solution for avoiding the overlapping of stored data in such a memory is an increase in the number of its cells to accommodate at least $2Z-1$ frames. Such a system, however, is rather complex and correspondingly costly.

It is also necessary to bear in mind that currently available memories have access times substantially exceeding the recurrence period of video samples or pixels whose repetition frequency is on the order of 10 MHz.

OBJECTS OF THE INVENTION

An important object of our present invention, therefore, is to provide a method of transforming an incoming data train into a modified outgoing train, for the purposes described, in a manner obviating the need for an oversized memory while enabling the prompt reloading of a cell as soon as it has been vacated.

A related object is to provide a system for the implementation of this method by relatively simple circuitry.

A more particular object of our invention is to adapt our improved method and system to the transmission of television pictures.

SUMMARY OF THE INVENTION

Stated in more general terms, the method according to our invention comprises as its first step a division of the incoming data train into recurrent sets of Z sequences of P data words each, with $P = X \cdot Y$ in a situation such as that of television signals where X and Y have the significance mentioned above, thus representing an orthogonal array. The data words of one set, numbering $Z \cdot P$, are successively written into respective cells of a multiplicity of storage units, at a rate of one data word per storage unit in cyclic succession, in a first sequential mode of addressing which conforms to the order of the data words in the original train. Next, the data words previously written therein are successively read out from the cells of these storage units, again at the rate of one data word per storage unit, in cyclic succession and in a second sequential mode of addressing in which homologous data words of the Z sequences are grouped into P consecutive series of Z data words each. Thereafter, the data words of the next set are written in the cells of the several storage units, immediately upon their readout in the preceding step, according to the second sequential mode. The subsequent readout occurs again in the first sequential mode and is followed by a writing of the data words of a further set in these cells—again immediately after their respective readout—in the same first mode. The foregoing steps are then repeated with the same alternation of modes for the data words of additional sets.

Advantageously, and as more fully described hereinafter, the number of storage units equals $Z^2$ whereby each unit accommodates $P/Z$ data words. These units can be subdivided into Z sections which are allotted to the data words of individual sequences (frames) whose order within the unit, however, is different for the two sequential modes.

In structural terms, a system according to our invention comprises memory means consisting of the aforementioned storage units with $P \cdot Z$ cells each, these storage units having writing terminals connected in parallel to input means supplying an incoming train of data words and reading terminals connected in parallel to output means receiving a modified outgoing train. The storage units are further connected to addressing means for identifying same in cyclic succession and selecting a cell of a unit so identified for reading and writing. The system further includes counting means for determining the end of a succession of $P \cdot Z$ data words in the incoming train as well as distributing means responsive to the counting means for controlling the addressing means to establish either of the two sequential modes discussed above, with change from one mode to the other after every succession of $P \cdot Z$ data words under the control of switchover means responsive to the counting means. The operation of the counting means is synchronized with the delivery, by the input means, of incoming data words with the aid of timing means also controlling the memory means in synchronism with the operation of the distributing means for commanding a readout of data words from selected cells and an immediately following writing of new data words therein during time intervals which are relatively staggered for the several storage units.

In the embodiment particularly described hereinafter, the addressing means comprises a multiplicity of address registers with outputs respectively connected to the several storage units and with inputs connected in parallel to respective stage outputs of the counting means. A plurality of logic gates, preferably of the Exclusive-OR (EX-OR) type, form part of the distributing means and are connected to other stage outputs of the counting means for sequentially activating these address registers. A first and a second plurality of these stage outputs, respectively extending from several lowest-ranking and several highest-ranking stages of the counting means, are interchangeably connectable by the switchover means to first and second input terminals of the logic gates which also have further input terminals connected to additional stage outputs. The logic gates may be divided into a first and a second group with input terminals respectively connectable by a first multiplexer of the switchover means to the lowest-ranking stage outputs and by a second multiplexer of the switchover means to the highest-ranking stage outputs in a first position of these multiplexers, the connections between the stage outputs of the counting means and the input terminals of the logic gates being reversed in a second multiplexer position. The second multiplexer may have output connections extending to input terminals of all logic gates while the second group of gates has further input terminals connected to additional stage outputs of the counting means. The output connections of the second multiplexer can also extend to the address registers associated with the several storage units.

In the case of a 3-dimensional structure of video samples or other data words, as discussed above, the described writing and reading in alternating sequential modes may be preceded at the transmission end by a conventional scrambling procedure involving transpositions within each orthogonal array and will then have to be followed at the receiving end by a complementary unscrambling procedure. Thus, the incoming train may not correspond to the original sequence of digitized samples obtained from the output of, say, a video camera but in many instances—including the embodiment described hereinafter—constitutes a series of data words which have already undergone a preliminary spatial transposition. After the data train has been modified in accordance with our new method, it can be subjected to a further transformation which will then have a 3-dimensional character on account of the preceding spatial/temporal transposition.

In the ensuing description it will be assumed that each data word consists of eight bits constituting a byte.

BRIEF DESCRIPTION OF THE DRAWING

The above and other features of our invention will now be described in detail with reference to the accompanying drawing in which:

FIG. 1a diagrammatically shows part of a conceptual 3-dimensional structure subjected to transformation in accordance with our present invention;

FIG. 7 schematically represents the storage units of FIG. 4 in a first state of loading.

SPECIFIC DESCRIPTION

Figure 1B:
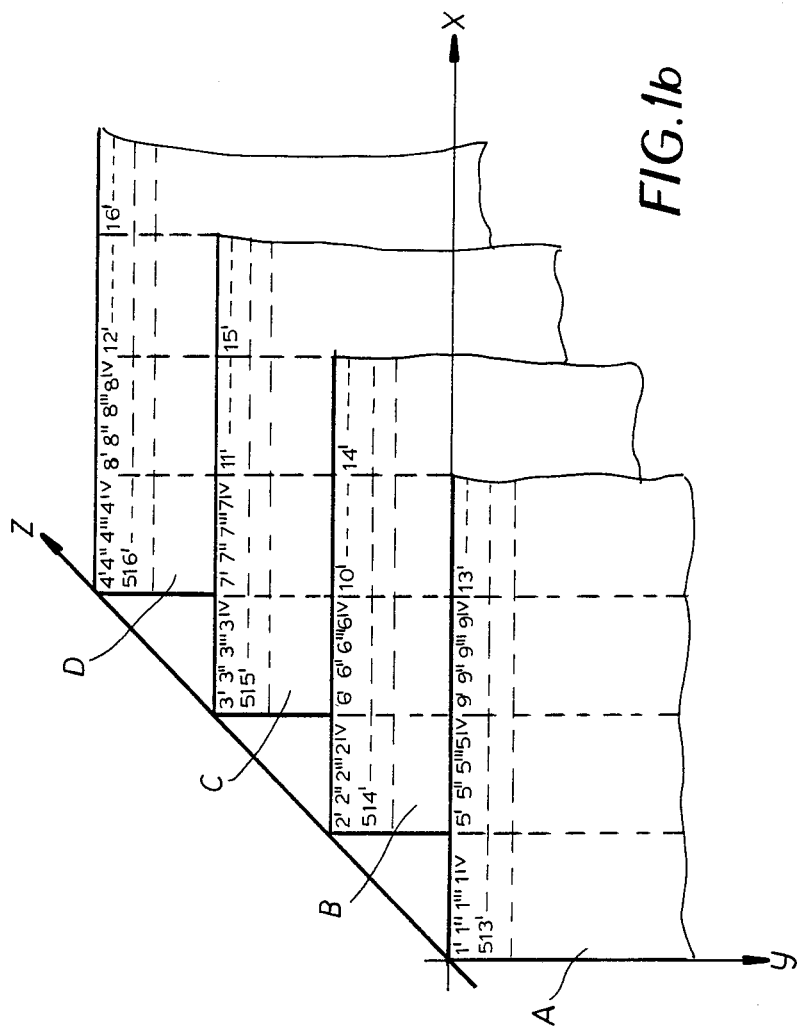
FIG. 1b is a similar representation of the same structure after transposition of its bytes pursuant to the present method.

FIGS. 1a and 1b depict part of a 3-dimensional structure conceptually formed from a train of $2^{20}$ bytes constituting the prescrambled contents of $Z=4$ frames each consisting of $Y=512$ horizontal lines of $X=512$ pixels each. The structure, in which the four frames are represented by parallel planes, thus has three mutually perpendicular axes x, y and z; axis x extends in the horizontal direction of the lines, axis y extends in the vertical direction corresponding to the succession of the lines in the respective planes and axis z extends in the direction of succession of the planes. In FIG. 1a the bytes have been designated $1'$, $2'$, $3'$ etc. for the first plane A, $1''$, $2''$, $3''$ etc. for the second plane B, $1'''$, $2'''$, $3'''$ etc. for the third plane C and $1^{iv}$, $2^{iv}$, $3^{iv}$ etc. for the fourth plane D. The order of appearance of the bytes in the planes of FIG. 1a reflects the first sequential addressing mode according to our invention which may also be termed the natural mode since it conforms to the order of emission of these bytes by their source.

FIG. 1b shows the same bytes transposed in conformity with the second sequential addressing mode of our invention according to which each plane contains, in its first line, consecutive series of four bytes each taken from homologous positions in the planes of FIG. 1a, with a quantum leap of $Z=4$ between successive series. Thus, the first line of plane A encompasses series $1'$, $1''$, $1'''$, $1^{iv}$; $5'$, $5''$, $5'''$, $5^{iv}$; $9'$, $9''$, $9'''$, $9^{iv}$; and so forth. The first line of plane B contains series $2'$, $2''$, $2'''$, $2^{iv}$; $6'$, $6''$, $6'''$, $6^{iv}$; and so forth. Plane C, in its first line, includes series $3'$, $3''$, $3'''$, $3^{iv}$; $7'$, $7''$, $7'''$, $7^{iv}$; and so forth. The first line of plane D, analogously, carries series $4'$, $4''$, $4'''$, $4^{iv}$; $8'$, $8''$, $8'''$, $8^{iv}$; and so forth. The first bytes of the second lines of planes A–D are $513'$, $513''$, $513'''$, $513^{iv}$ in FIG. 1a and $513'$, $514'$, $515'$, $516'$ in FIG. 1b, respectively.

The alternation between the structures of FIGS. 1a and 1b is achieved by selective addressing of 16 storage units in writing and reading operations as will be described hereinafter with particular reference to FIGS. 7 and 8.

Figure 2:
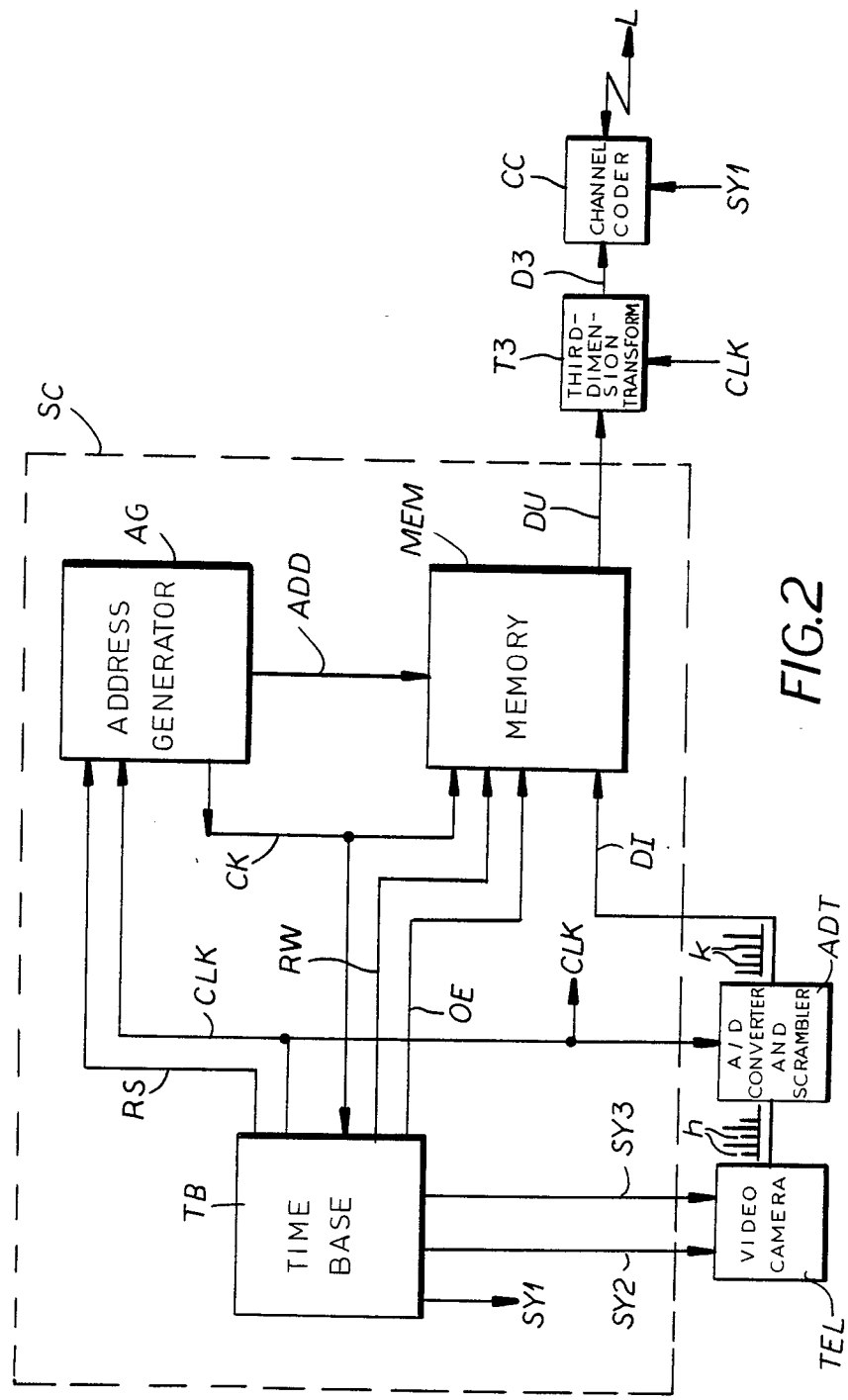
FIG. 2 is a block diagram of a system for the scrambling of outgoing television pictures in accordance with our invention.

FIG. 2 shows a system for the transmission of spatially and temporally transposed television signals in accordance with our invention. The system comprises a scrambler SC including a time base TB, an address generator AG and a memory MEM. A video camera TEL receives synchronizing pulses SY2 and SY3 for its line and frame scans from time base TB and emits amplitude samples h to an analog/digital converter ADT controlled by clock pulses CLK from that time base. Converter ADT also performs 2-dimensional transpositions within each frame and emits a train of bytes k, $2^{18}$ per frame, given for purposes of this description the designations $1'$, $2'$, $3'$ etc., $1''$, $2''$, $3''$ etc., $1'''$, $2'''$, $3'''$ etc., and $1^{iv}$, $2^{iv}$, $3^{iv}$ etc, in the order discussed with reference to FIG. 1a. This train of bytes is delivered on a bus DI to memory MEM from which, after transformation, it emerges as a modifed train on a bus DU extending to a further scrambler T3. The latter performs additional transpositions which, though basically of the same conventional type as those carried out by block ADT, can be considered 3-dimensional transformations since they also involve the temporal third dimension z of FIGS. 1a and 1b. Under the control of clock pulses CLK, block T3 delivers the outgoing train of bytes via a bus D3 to a channel coder CC which is synchronized with the other components by a signal SY1 from time base TB and works into a signal path L. This signal path may operate with time-division multiplexing (TDM) to generate a recurrent pulse-code-modulation (PCM) frame having a multiplicity of time slots allocated to as many PCM channels among which the bytes of the outgoing train are distributed as is well known in the art. Signal path L is shown to be bidirectional to indicate that the station of FIG. 2 may also receive similarly scrambled television signals from a remote transmitter; the corresponding unscrambling circuitry, complementing components ADT, SC and T3, has not been illustrated. Pulses SY1, accompanying the outgoing bytes, also synchronize the operation of memory MEM with that of its counterpart in the remote receiver.

Time base TB initially emits a starting signal RS to address generator AG which also receives the clock pulses CLK. Distribution pulses are sent by address generator AG on a bus CK to memory MEM and to time base TB. The latter also periodically emits read/-write signals on a bus RW and output-enabling signals on a bus OE for the control of the operations of memory MEM. An address bus ADD extends to that memory from generator AG.

Figure 3:
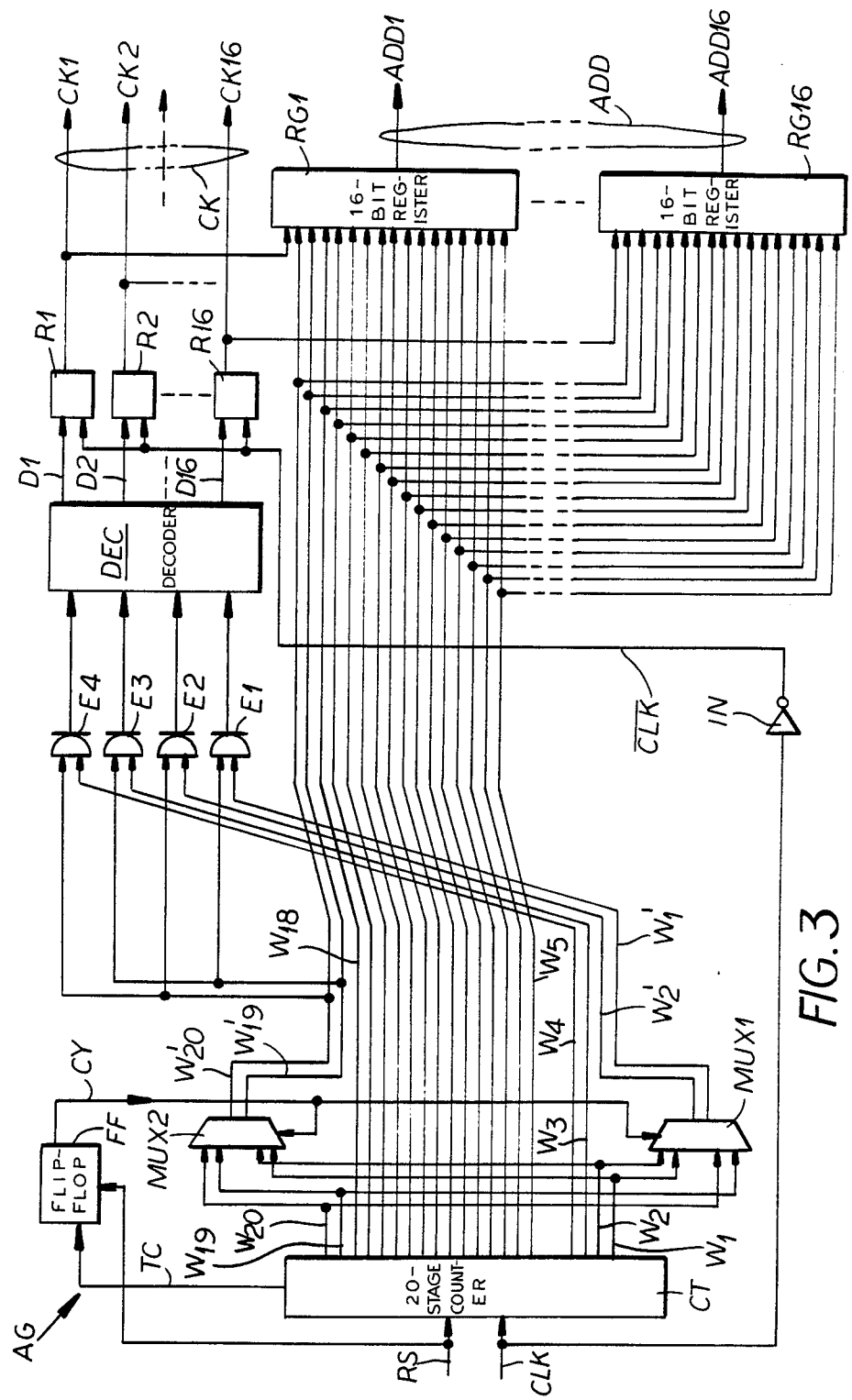
FIG. 3 shows details of an address generator included in the system of FIG. 2.

As shown in FIG. 3, address generator AG comprises a 20-stage counter CT whose stages have output leads or wires $W_1, W_2, W_3, W_4, W_5, \ldots W_{18}, W_{19}$ and $W_{20}$. Another output lead TC of counter CT extends to a switching input of a flip-flop FF of the set/reset type having an output lead CY connected in parallel to control inputs of two multiplexers MUX1 and MUX2. Counter CT is initially activated by starting pulse RS, which also originally resets the flip-flop FF, and is stepped by clock pulses CLK coinciding with the emission of a byte k by converter ADT of FIG. 2.

The stage outputs $W_1$–$W_{20}$ of counter CT carry at any time a 20-bit word whose numerical value ranges from zero through $P \cdot Z - 1$, i.e. $2^{20} - 1$ in the present instance. The two least-significant bits of this word, present on the lowest-ranking stage outputs $W_1$ and $W_2$, are fed in parallel to respective pairs of inputs of multiplexers MUX1 and MUX2; the two most-significant bits, present on the highest-ranking stage outputs $W_{19}$ and $W_{20}$, are similarly fed to other input pairs of these multiplexers which have respective pairs of output leads $W'_1, W'_2$ and $W'_{19}, W'_{20}$. Four EX-OR gates E1–E4 have respective input terminals connected to leads $W'_1$, $W'_2$, $W_3$ and $W_4$. Gates E1 and E3 also have input terminals connected in parallel to lead $W'_{19}$ while gates E2 and E4 have input terminals connected in parallel to lead $W'_{20}$.

The outputs of logic gates E1–E4 are connected to a decoder DEC having 16 outgoing leads D1, D2, . . . D16 terminating at respective 1-bit registers R1, R2, . . . R16. Registers R1–R16 have output leads CK1, CK2, . . . CK16, collectively representing the bus CK, which extend to respective enabling inputs of as many 16-bit address registers RG1–RG16 whose own output multiples ADD1–ADD16 collectively constitute the bus ADD. The 16 data inputs of these address registers are connected in parallel to stage outputs $W_5$–$W_{18}$ of counter CT and to output leads $W'_{19}$ and $W'_{20}$ of multiplixer MUX2. Registers R1–R16 are loadable under the control of the complement $\overline{CLK}$ of clock pulses CLK emitted by an inverter IN which also delays them by an interval corresponding to the combined response times of counter CT, gates E1–E4 and decoder DEC.

Flip-flop FF, when initially reset, switches multiplexers MUX1 and MUX2 into a first position in which leads $W_1$, $W_2$ and $W_{19}$, $W_{20}$ are respectively connected to leads $W'_1$, $W'_2$ and $W'_{19}$, $W'_{20}$. In this multiplexer position, the beginning of a $2^{20}$-step counting cycle finds the inputs of all gates E1–E4 at logical "0" so that their combined outputs have the configuration 0 0 0 0; decoder DEC repsonds to that configuration by energizing output leads D1 and CK1, thereby enabling the initial loading of address register RG1 whose 16 data inputs receive an all-zero word from counter CT and multiplexer MUX2. The appearance of the same word on the 16-lead output multiple ADD1 of this register identifies the first cell of an associated storage unit included in memory MEM as more fully described hereinafter. The next 15 counting steps, during which leads $W'_{19}$ and $W'_{20}$ remain de-energized, lets circuits E1–E4 operate as simple OR gates whereby bit combinations representing numerical values from 1 through 15 appear at the inputs of the decoder; the latter, always incrementing these numerical values by one, correspondingly energizes output leads D2–D16 and CK2–CK16 with consequent activation of respective address registers other than register RG1. The data inputs of all these address registers, however, still receive only zeroes until the 16$^{th}$ step after the zero-setting of counter CT which thereupon energizes its stage output $W_5$; with stage outputs $W_1$–$W_4$ now once more de-energized, gates E1–E4 are again cut off so that decoder DEC energizes output leads D1 and CK1, thereby initiating another cycle of successive activation of address registers RG1–RG16. The addresses received by the data inputs of the temporarily enabled registers now change progressively with every 16 counting steps so that each of these registers is reloaded and emits a new address word upon each recurrent activation. Since stage outputs $W_{19}$ and $W_{20}$ are respectively connected to leads $W'_{19}$ and $W'_{20}$, this mode of addressing continues until the counter has run its full course.

The $2^{20}$-step counting cycle just described can be regarded as divided into four subcycles of $2^{18}$ steps each. With a resetting of the counter to zero considered as the first step, the second, third and fourth subcycles respectively begin with the exclusive energization of wire $W_{19}$ on the $(2^{18}+1)^{th}$ step, the exclusive energization of wire $W_{20}$ on the $(2^{19}+1)^{th}$ step and the joint energization of wires $W_{19}$ and $W_{20}$ on the $(2^{18}+2^{19}+1)^{th}$ step. With the multiplexers in their aforedescribed first position, these four subcycles correspond to a consecutive scanning of planes A–D in FIG. 1a.

When flip-flop FF switches over at the end of the fourth subcycle, multiplexer MUX1 connects wires $W_{19}$ and $W_{20}$ to leads $W'_1$ and $W'_2$ while multiplexer MUX2 establishes continuity between wires $W_1$, $W_2$ and $W'_{19}$, $W'_{20}$. On the first step of the new cycle, with counter CT again having an all-zero output, gates E1–E4 are cut off as before and decoder DEC energizes its output lead D1. On the next step, however, lead $W'_{19}$ is energized along with respective input terminals of gates E1 and E3 as well as the second-highest data inputs of all address registers. With gates E1 and E3 now acting as inverters, decoder DEC energizes its sixth output lead and enables the corresponding address register. That register, in response to logical "1" on lead $W'_{19}$, then emits an address code of numerical value $2^{14}$ identifying the $(2^{14}+1)^{th}$ cell of the associaed storage unit of memory MEM. The next step, which energizes lead $W'_{20}$ in lieu of lead $W'_{19}$, turns on the gates E2 and E4 with resulting energization of the eleventh output lead of decoder DEC and reloading of the corresponding address register whose highest data terminal is concurrently energized, thereby identifying the $(2^{15}+1)^{th}$ cell of the associated storage unit. On the fourth step, the simultaneous energization of leads $W'_{19}$ and $W'_{20}$ causes conduction of all four logic gates E1–E4 with energization of lead D16, reloading of register RG16 and emission of a word of numerical value $2^{14}+2^{15}$ on its 16-lead output multiple ADD16, thereby identifying the $(2^{14}+2^{15}+1)^{th}$ cell of the sixteenth storage unit. The sequential reloading of the 16 address registers RG1–RG16 periodically recurs throughout the four subcycles of counter CT which in this instance corresponds to a consecutive scanning of planes A–D in FIG. 1b.

The end of the counting cycle last described causes a resetting of flip-flop FF with return to the first sequential mode of addressing.

Figure 4:
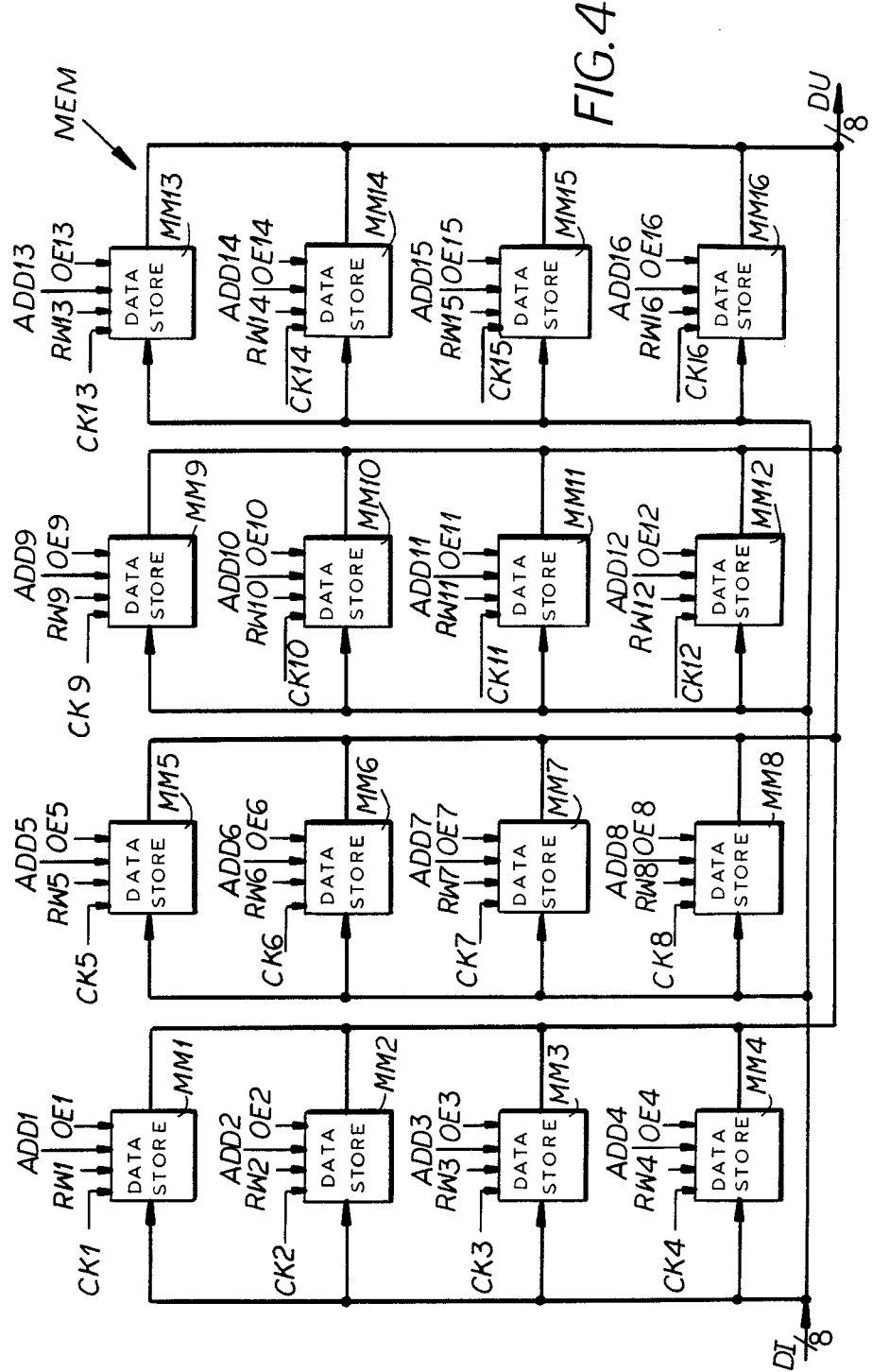
FIG. 4 shows a matrix of storage units forming part of a memory included in that system.

In FIG. 4 we have illustrated data stores MM1–MM16 of memory MEM arrayed in a square 4×4 matrix. Each data store includes a storage unit of the dynamic random-access (RAM) type with a storage capacity on the order of 64 Kbytes; more precisely, each RAM is formed from $2^{16}$ cells which are selectively addressable by multiplex ADD1–ADD16 originating at registers RG1–RG16 of FIG. 3. The cells of each RAM are destructively read out so as to require refreshing even if their contents are to remain unchanged. Data stores MM1–MM16 also receive individual clock pulses on leads CK1–CK16, read/write signals on leads RW1–RW16 and output-enabling pulses on leads OE1–OE16 forming part of the buses CK, RW and OE of FIG. 2. FIG. 4 further shows the incoming bus DI and the outgoing bus DU, each in the form of an 8-lead multiple, respectively connected in parallel to the writing terminals and the reading terminals of data stores MM1–MM16.

Figure 5:
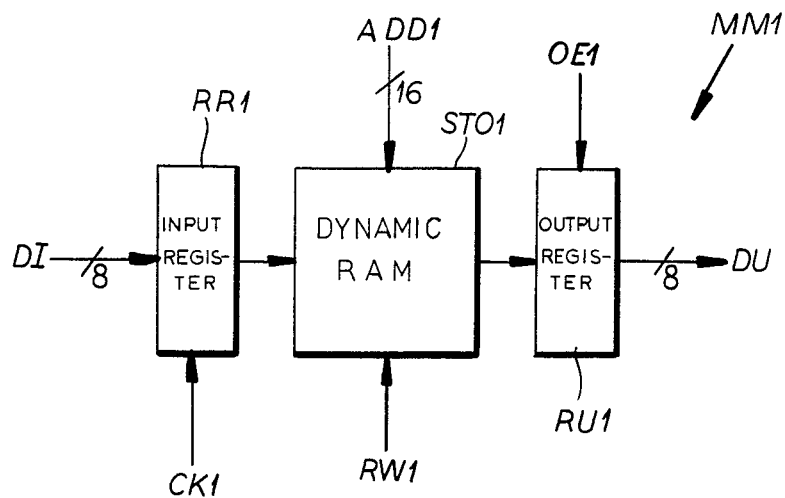
FIG. 5 is a more detailed representation of one of the storage units shown in FIG. 4.
Figure 6:
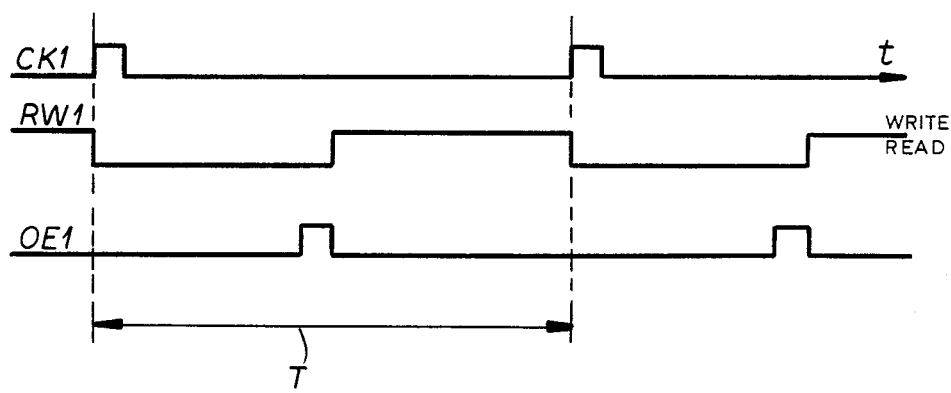
FIG. 6 is a set of graphs relating to the operation of the storage unit of FIG. 5.

FIG. 5 illustrates details of data store MM1, which of course is representative of all the units in the matrix of FIG. 4, as comprising a dynamic RAM STO1 provided with an input register RR1 and an output register RU1. Timing pulses on lead CK1 control the loading of register RR1 with the bytes successively appearing on bus DI whereas enabling pulses on lead OE1 command the discharge of bytes read out into register RU1 from storage unit STO1 under the control of the signal on lead RW1. Since unit STO1 needs to be addressed only once during a distribution interval T (FIG. 6) of 16 byte periods corresponding to steps of counter CT, input register RR1 retains the new byte received from bus DI upon its enablement by a pulse on lead CK1. In the first half of time T, as seen in FIG. 6, the signal on lead RW1 is low to command a reading of the cell then addressed by multiple ADD1 according to the contents of register RG1 (FIG. 3) which also remain unchanged throughout that period. The arrival of a pulse on lead OE1 about halfway through period T unloads the output register RU1 and is immediately followed by a writing command represented by a high signal level on lead RW1. Thus, the addressed memory cell just vacated is now loaded with the contents of input register RR1 while output register RU1 is blocked.

As will be apparent from the preceding description of FIG. 3, the several distribution intervals T allocated to data stores MM1–MM16 are relatively staggered by single byte periods corresponding to steps of counter CT.

Figure 7:
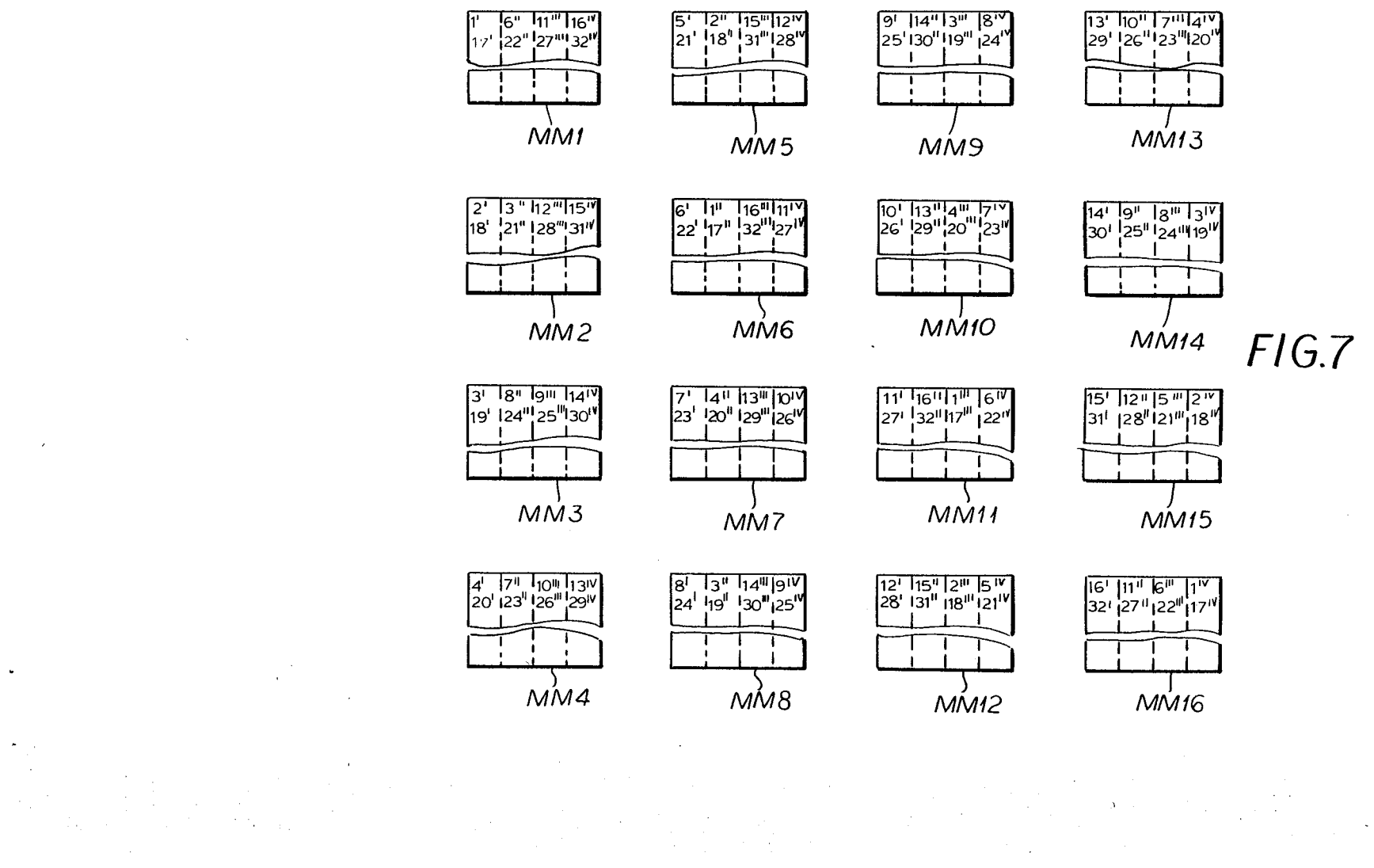
Figure 8:
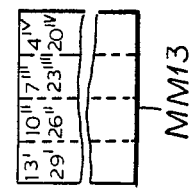
FIG. 8 is a representation similar to that of FIG. 7, showing the storage units in a second state of loading.
Figure 8:
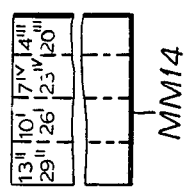
Figure 8:
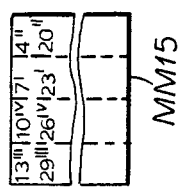
Figure 8:
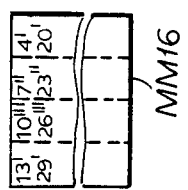
Figure 8:
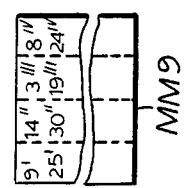
Figure 8:
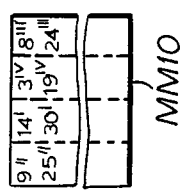
Figure 8:
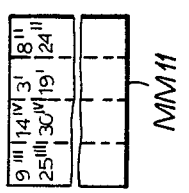
Figure 8:
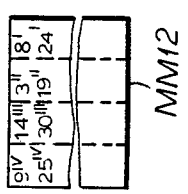
Figure 8:
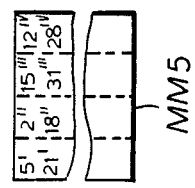
Figure 8:
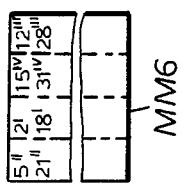
Figure 8:
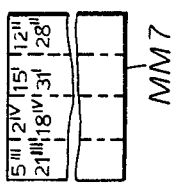
Figure 8:
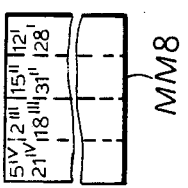
Figure 8:
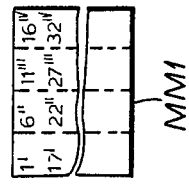
Figure 8:
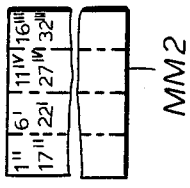
Figure 8:
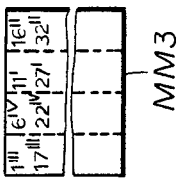
Figure 8:
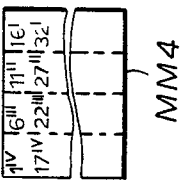

FIGS. 7 and 8 show the RAMs of data stores MM1–MM16 each divided into four parallel sections, each section containing $2^{14}$ cells to accommodate $P/Z^2$ bytes; only the first two cells of each section have been identified in terms of their contents according to the designation of the bytes used in FIGS. 1a and 1b. FIG. 7 represents these cells as written in the natural mode corresponding to the first position of multiplexers MUX1 and MUX2 in FIG. 3. Thus, the cyclic activation of registers RG1–RG16 and the address words respectively emitted thereby cause bytes 1′, 2′ etc. to be written in the first (left-hand) section of each RAM in the first subcycle of counter CT, followed by the sequential loading of the cells of the other three sections with bytes 1″, 2″ etc., 1‴, 2‴ etc. and $1^{iv}$, $2^{iv}$ etc. in the three remaining subcycles. At the end of this writing operation, therefore, the contents of the first, second, third and fourth sections of units MM1–MM16 respectively correspond to the bytes present in planes A, B, C and D of FIG. 1a.

The very first writing operation, proceeding in the natural mode referred to, is performed with all the cells empty and is therefore not preceded by an effective readout; thus, the reading phase of the signals on bus RW may be suppressed during the initial counting cycle. With flip-flop FF switched over in the second counting cycle, the cells are read in the second sequential mode with addressing of the first cell of the first section of unit MM1, the first cell of the second section of unit MM6, the first cell of the third section of unit MM11 and the fourth cell of the fourth section of unit MM16 in the first fourth counting steps of this cycle for the reasons discussed above. Since each cell is being reloaded immediately after having been read out, bytes 1′, 2′ etc. of the next train are written in that order in the cells so vacated to provide the pattern shown in FIG. 8 in which the contents of the four sections of units MM1–MM16 conform to the distribution of the bytes in the planes A–D of FIG. 1b. Here, too, each section of a given unit contains only the bytes of one of the planes of FIG. 1b; the order of these planes remains constant within each row but varies within each column of the matrix of FIG. 8.

Reading and writing proceeds in the natural mode during the next-following counting cycle so that the pattern of FIG. 7 is re-established. The two patterns alternate in this manner throughout the transmission of video signals over path L of FIG. 2.

As will be readily apparent, a reading of the pattern of FIG. 7 in the first sequential mode and of the pattern of FIG. 8 in the second sequential mode of addressing restores the natural sequence in both instances so that the operation of the nonillustrated unscrambler at the remote station or in the receiving section of the station of FIG. 2 is analogous to that described for scrambler SC. The cancellation of the transpositions carried out in blocks ADT and T3, in a manner known per se, will of course have to be performed separately. It will be understood that the scrambling and unscrambling operations according to our invention can also be implemented without these additional transpositions, yet the combination therewith greatly reduces the possibility of successful reconstruction by an interceptor.

We claim:

1. A system for transforming an incoming train of data words into a modified outgoing train retransformable into a replica of said incoming train after intermediate storage, comprising:

memory means with a multiplicity of storage units together having P·Z cells for accommodating a recurrent set of Z sequences of P data words of said incoming train;

input means connected in parallel to respective writing terminals of said storage units for supplying said incoming train thereto;

output means connected in parallel to respective reading terminals of said storage units for receiving said outgoing training therefrom;

addressing means connected to said storage units for identifying same in cyclic succession and selecting a cell of a storage unit so identified for reading and writing;

counting means for determining the end of a succession of P·Z data words in said incoming train;

distributing means responsive to said counting means for controlling said addressing means to establish either of two modes of selecting the cells in which data words are to be read and written, said modes including a first mode conforming to the order of occurrence of said data words in said incoming train and a second mode according to which homologous data words of said Z sequences are grouped into P consecutive series of Z data words each;

switchover means responsive to said counting means for modifying the operation of said distributing means after every succession of P·Z data words to change from one of said modes to the other; and timing means synchronizing the operation of said counting means with the delivery of incoming data words by said input means, said timing means controlling said memory means in synchronism with the operation of said distributing means for commanding a readout of data words from selected cells and an immediately following writing of new data words therein during intervals which are relatively staggered for said multiplicity of storage units.

2. A system as defined in claim 1 wherein said input means comprises a video camera scanning a scene to be televised in consecutive frames of Y rows of X picture elements each, with $P = X \cdot Y$, said data words being digitized samples of said picture elements.

3. A system as defined in claim 1 wherein said adressing means comprises a multiplicity of address registers with outputs respectively connected to said storage units and with inputs connected in parallel to respective stage outputs of said counting means, said distributing means comprising a plurality of logic gates connected to other stage outputs of said counting means for sequentially activating said address registers.

4. A system as defined in claim 3 wherein said stage outputs include a first plurality of stage outputs extending from several lowest-ranking stages and a second plurality of stage outputs extending from several highest-ranking stages of said counting means, said logic gates having first input terminals and second input terminals interchangeably connectable to said first and second pluralities of stage outputs by said switchover means.

5. A system as defined in claim 4 wherein said logic gates are of the Exclusive-OR type.

6. A system as defined in claim 4 wherein said switchover means comprises a first multiplexer connecting said first plurality of stage outputs to the input terminals of a first group of said logic gates and a second multiplexer connecting said second plurality of stage outputs to the input terminals of a second group of said logic gates in a first position, said multiplexers reversing the connections between said pluralities of stage outputs and said input terminals in a second position.

7. A system as defined in claim 6 wherein said second multiplexer has output connections extending to input terminals of all said logic gates, said second group of logic gates having further input terminals connected to additional stage outputs of said counting means.

8. A system as defined in claim 7 wherein the output connections of said second multiplexer also extend to said address registers.

9. A system as defined in claim 6 wherein said switchover means further comprises a flip-flop controlling said multiplexers, said flip-flop being alternately settable and resettable by said counting means after the arrival of every P·Z data words.

10. A system as defined in claim 1 wherein the number of said storage units is $Z^2$, each storage unit being divided into Z sections each accommodating P data words.

11. A system as defined in claim 6 wherein said input means further comprises pretransformation means inserted between said video camera and said memory means for transposing certain digitized samples within each frame.

* * * * *